United States Patent
Hasegawa

(10) Patent No.: US 7,188,979 B2
(45) Date of Patent: Mar. 13, 2007

(54) AUTOMATIC VEHICLE HEADLIGHT BEAM DIRECTION ADJUSTMENT SYSTEM

(75) Inventor: Junichi Hasegawa, Kariya (JP)

(73) Assignee: Denso Corporation, Kariya (JP)

( * ) Notice: Subject to any disclaimer, the term of this patent is extended or adjusted under 35 U.S.C. 154(b) by 86 days.

(21) Appl. No.: 11/043,191

(22) Filed: Jan. 27, 2005

(65) Prior Publication Data

US 2005/0169000 A1    Aug. 4, 2005

(30) Foreign Application Priority Data

Jan. 29, 2004   (JP)   ............................. 2004-021491
Nov. 26, 2004   (JP)   ............................. 2004-341863

(51) Int. Cl.
*B60Q 1/06*   (2006.01)
(52) U.S. Cl. .................. 362/466; 362/428; 362/276
(58) Field of Classification Search ................ 362/464, 362/465, 466, 428, 276, 273; 701/49
See application file for complete search history.

(56) References Cited

U.S. PATENT DOCUMENTS 6,609,817 B2   8/2003   Niwa et al.

2002/0080617 A1    6/2002   Niwa et al.
2003/0043588 A1 *  3/2003   Horii ........................... 362/466
2004/0160759 A1 *  8/2004   Ishiguro et al. ............... 362/37
2004/0210369 A1 * 10/2004   Mizuno et al. ............... 701/49

FOREIGN PATENT DOCUMENTS

JP       A-2002-254980          9/2002

* cited by examiner

*Primary Examiner*—Laura K. Tso
(74) *Attorney, Agent, or Firm*—Posz Law Group, PLC

(57) ABSTRACT

An automatic vehicle headlight beam direction adjustment system, able to learn early of errors in front road information from a navigation system and eliminate continued adjustment of the beam directions of headlights in a mistaken direction, which makes the beam directions of the left and right headlights swivel for adjustment in the left-right directions parallel to a horizontal direction based on an estimated swivel control angle calculated in accordance with a speed and front road information, determines that there is an error in the estimated swivel control angle and cancels swivel advance control when the beam directions are not the direction of advance of the vehicle regardless of the vehicle running straight after the swivel advance control has continued for a predetermined time after operation of the steering wheel, and can therefore prevent swivel advance control from continuing over a predetermined time due to error of the front road information and quickly restore advance visibility of the driver.

3 Claims, 5 Drawing Sheets

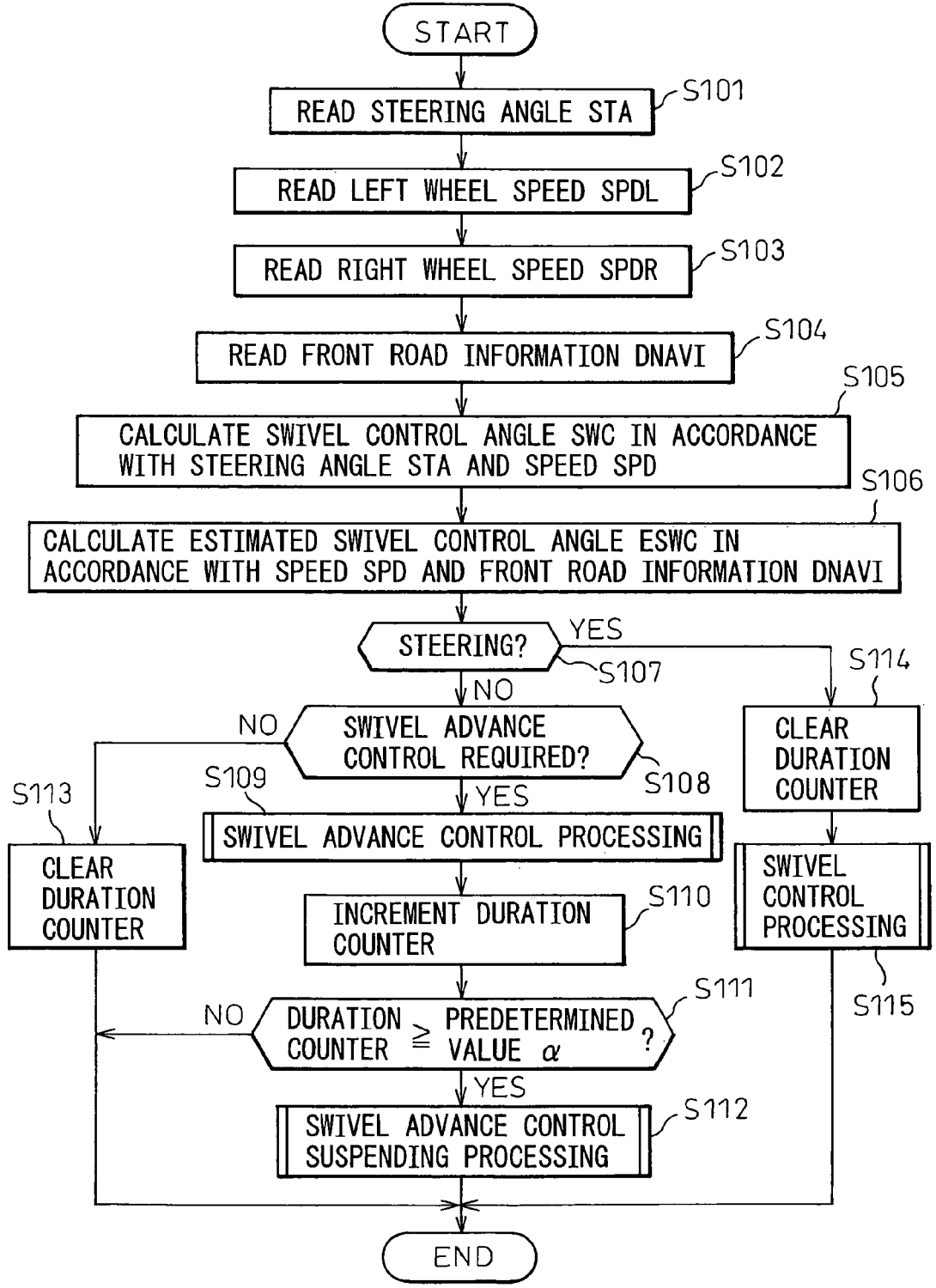

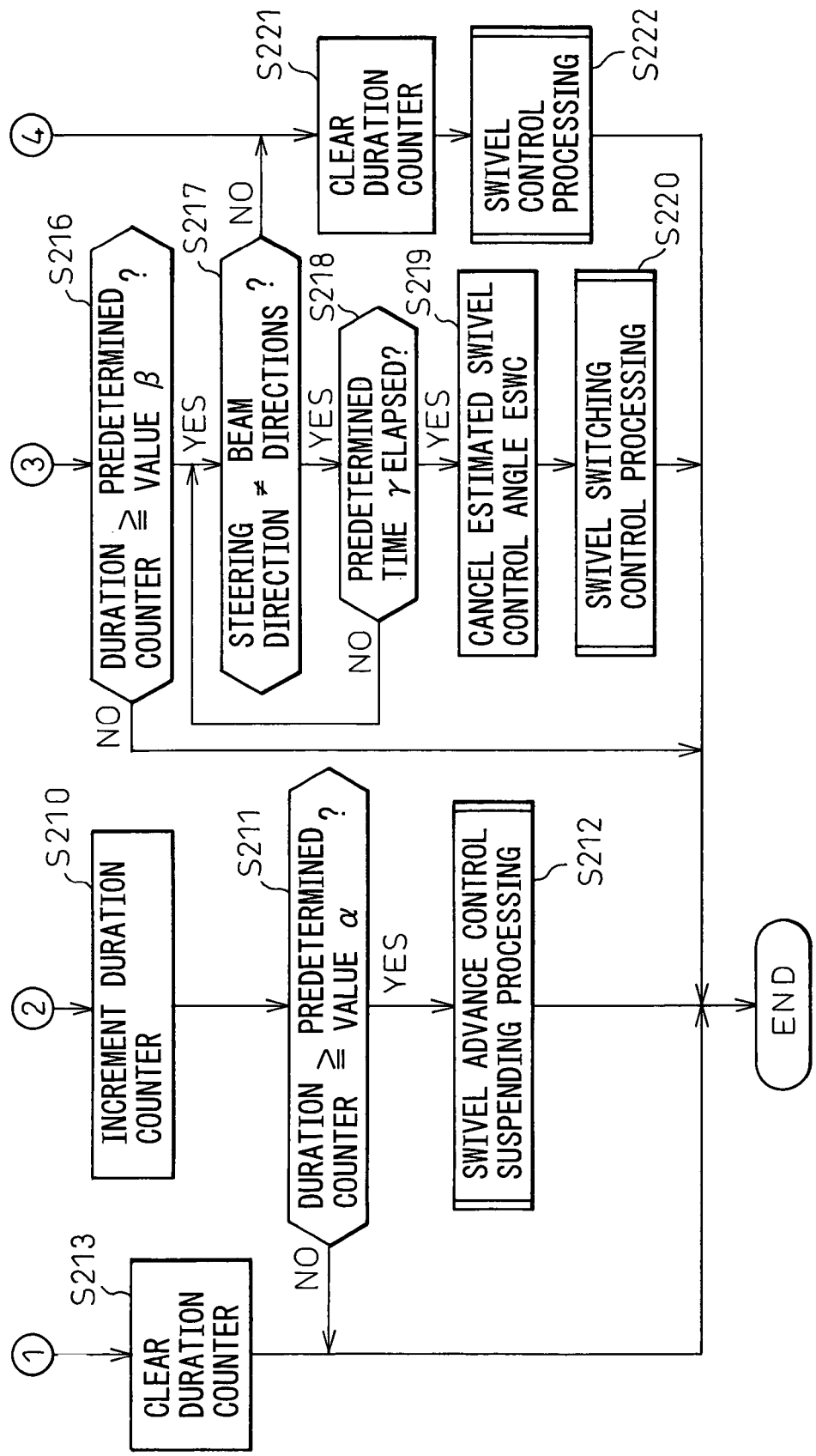

AUTOMATIC VEHICLE HEADLIGHT BEAM DIRECTION ADJUSTMENT SYSTEM

BACKGROUND OF THE INVENTION

1. Field of the Invention

The present invention relates to an automatic vehicle headlight beam direction adjustment system for automatically adjusting the beam directions or illumination regions in directions of left and right on the basis of headlights provided at a vehicle in accordance with a steering angle of a steering wheel.

2. Description of the Related Art

In the past, as related art relating to an automatic vehicle headlight beam direction adjustment system, the one disclosed in Japanese Unexamined Patent Publication (Kokai) No. 2002-254980 has been known. This discloses technology for reducing the effect of detection error due to the sensor elements in particular in the navigation function of a navigation system and securing suitable beam illumination.

In the above, the illumination regions or glares of the headlights are controlled in accordance with the determination of the running region of the vehicle based on the front road information comprised of map information, vehicle position, etc. from the navigation system and the beam directions of the headlights are controlled in accordance with determination of the road shape.

Here, the front road information from the navigation system is not necessarily accurate, so the control quantity based on the front road information may be unsuitable. This being the case, the illumination regions, glares, or beam directions of the headlights will continue to be unsuitably adjusted in accordance with the control quantity based on the front road information from the navigation system.

However, in the above, when controlling the illumination regions, glares, or beam directions of the headlights, the control is not swivel control making the beam directions of the headlights swivel in the left-right directions parallel to the horizontal direction for adjustment, so even if the illumination regions, glares, or beam directions of the headlights become unsuitable, the front visibility of the driver is not remarkably impaired.

As opposed to this, assume that in swivel control making the beam directions of the headlights swivel in the left-right directions parallel to the horizontal direction for adjustment in advance based on front road information from the navigation system, despite the front road in the direction of advance of the vehicle being straight, a misunderstanding has arisen that the road is a turn due to an error of the front road information comprised of map information, vehicle position, etc. from the navigation system. In this case, the problem arises that by the beam directions of the headlights continuing to be adjusted in mistaken directions in accordance with a control quantity based on front road information from the navigation system, the front visibility of the driver is seriously impaired.

An object of the present invention is to provide an automatic vehicle headlight beam direction adjustment system able to quickly learn of errors in front road information from a navigation system and prevent continued adjustment of the beam directions of the headlights in mistaken directions so as to quickly restore the front visibility of the driver in swivel control making the beam directions of the headlights swivel in left-right directions parallel to the horizontal direction for adjustment in advance of front road information from the navigation system.

SUMMARY OF THE INVENTION

According to an automatic vehicle headlight direction adjustment system of the first aspect of the invention, when the estimated control quality using as parameters the speed detected by speed detecting means by estimated control quantity processing means and front road information from a navigation system detected by road information detecting means is calculated before the steering angle is detected by steering angle detecting means, the beam directions of the headlights of the vehicle are swiveled in the left-right directions parallel to the horizontal direction for adjustment based on the estimated control quantity by swivel advance control means. After the swivel advance control in advance of operation of the steering wheel continues for a predetermined time, despite running state determining means determining that the vehicle is in running straight, when the beam directions of the headlights at that time are not the front direction of the vehicle, it is judged that there is an error in the estimated control quantity and swivel suspending means suspends the adjustment of the beam directions of the headlights based on the estimated control quantity. Due to this, before detection of the steering angle, swivel advance control making the beam directions of the headlights swivel in the left-right directions parallel to the horizontal direction for adjustment is not continued over the predetermined time due to an error in the front road information regardless of the vehicle running straight, so the effect is obtained that the front visibility of the driver is quickly restored.

The running state determining means in the automatic vehicle headlight beam direction adjustment system of the second aspect of the invention uses at least one parameter of the steering angle, a wheel speed difference between the speed of the left/right wheels of the vehicle, a yaw rate, and a horizontal direction G (gravity) to accurately determine if the vehicle is running straight or turning. Due to this, the effect is obtained that the suitability of the swivel advance control in advance of the operation of the steering wheel is quickly learned.

According to an automatic vehicle headlight direction adjustment system of the third aspect of the invention, when an estimated control quality using as parameters a speed detected by speed detecting means by estimated control quantity processing means and front road information from a navigation system detected by road information detecting means is calculated before a steering angle is detected by steering angle detecting means, beam directions of the headlights of the vehicle are swiveled in the left-right directions parallel to the horizontal direction for adjustment based on the estimated control quantity by swivel advance control means. On the other hand, after the steering angle detecting means detects the steering angle, after the adjustment of the beam directions of the headlights based on the estimated control quantity by the swivel advance control means continues for a predetermined time, when the adjustment direction determining means determines that the adjustment directions of the beam directions of the headlights based on the control quantity calculated by control quantity processing means and the adjustment directions of the beam directions of the headlights based on the estimated control quantity calculated by the estimated control quantity processing are different from each other using as parameters the steering angle detected by the steering angle detecting means and the speed detected by the speed detecting means, it is judged that there is an error in the estimated control quantity and the swivel switching control means cancels the estimated control quantity and switches to adjustment of the beam directions of the headlights based on only the control quantity. Due to this, after detection of the steering angle, if the adjustment directions of the beam directions of the headlights by the swivel advance control making the beam directions of the headlights swivel in the left-right directions parallel to the horizontal direction for adjustment according to the estimated control quantity are different from the adjustment directions for making the beam directions of the headlights swivel in the left-right directions parallel to the horizontal direction for adjustment by the control quantity, it is judged that there is an error in the front road information, the estimated control quantity is canceled, adjustment of the beam directions of the headlights by just the control quantity is switched to, and swivel advance control is not continued over a predetermined time, so there is the effect that the front visibility of the driver is quickly restored.

BRIEF DESCRIPTION OF THE DRAWINGS

These and other objects and features of the present invention will become clearer from the following description of the preferred embodiments given with reference to the attached drawings, wherein:

FIG. 3 is a flow chart of a processing routine of swivel control in a central processing unit (CPU) in an electronic control unit (ECU) used in an automatic vehicle headlight beam direction adjustment system according to a first embodiment of the present invention; and FIG. 4A and FIG. 4B are a flow chart of a processing routine of swivel control in a CPU in an ECU used in an automatic vehicle headlight beam direction adjustment system according to a second embodiment of the present invention.

DESCRIPTION OF THE PREFERRED EMBODIMENTS

Preferred embodiments of the present invention will be described in detail below while referring to the attached figures.

First Embodiment

Figure 1:
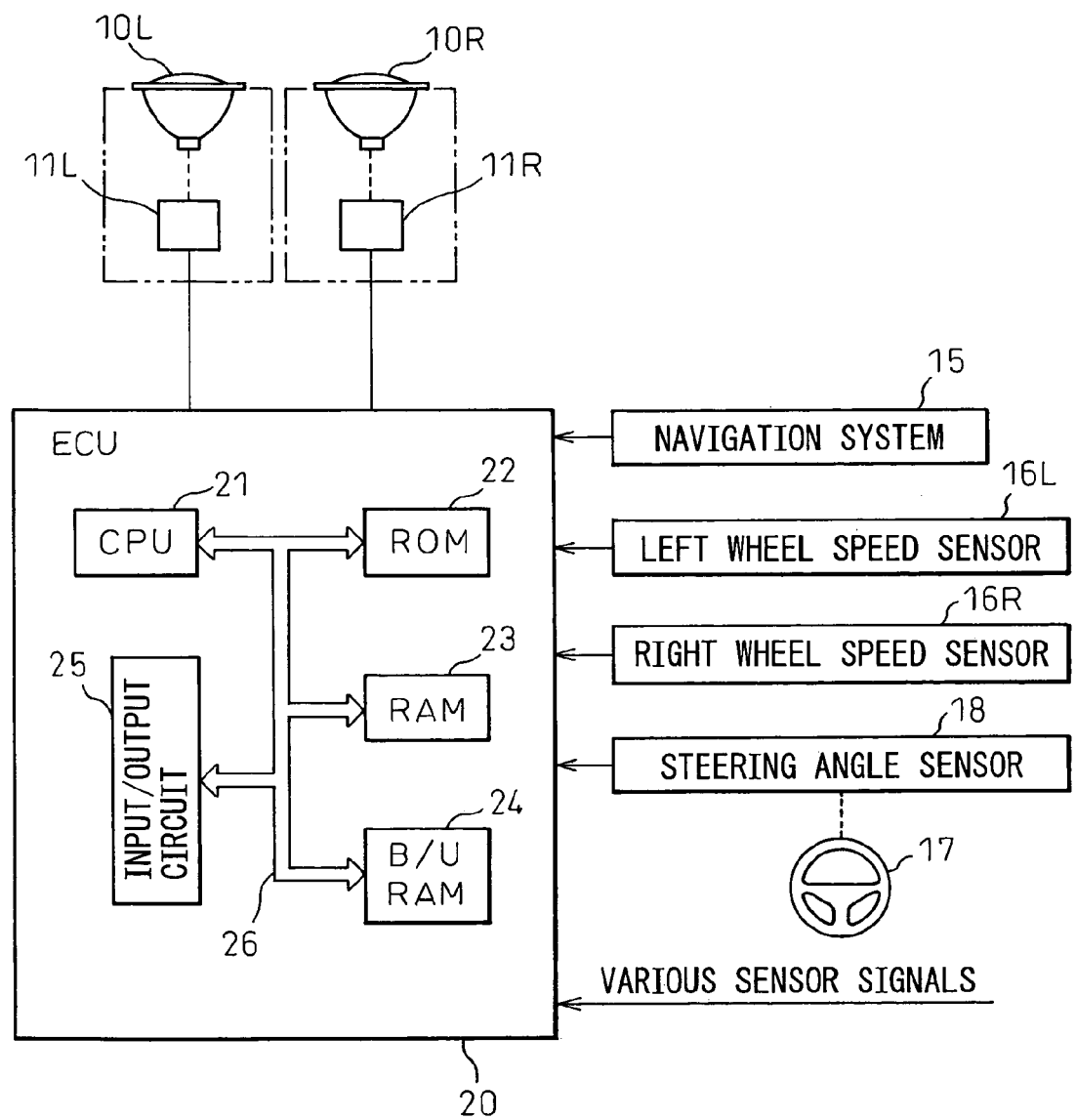
FIG. 1 is a schematic view of the overall configuration of an automatic vehicle headlight beam direction adjustment system according to a first embodiment and second embodiment of the present invention.

FIG. 1 is a schematic view of the overall configuration of an automatic vehicle headlight beam direction adjustment system according to a first embodiment of the present invention.

In FIG. 1, the front of the vehicle is provided with headlights comprised of left and right headlights 10L and 10R. These headlights 10L and 10R are connected to actuators 11L and 11R for adjustment of the beam directions. Reference numeral 20 is an electronic control unit (ECU). The ECU 20 is comprised of a central processing unit (CPU) 21 for executing various known processings, a read only memory (ROM) 22 for storing control programs, control maps, etc., a random access memory (RAM) 23 for storing various data, a backup (B/U) random access memory (RAM) 24, an input/output circuit 25, a bus line 26 connecting these, etc. for constituting a logical processing circuit.

The ECU 20 receives as inputs an output signal from a known navigation system 15 mounted in a vehicle, an output signal from a left wheel speed sensor 16L for detecting a left wheel speed VL of a left wheel of the vehicle, an output signal from a right wheel speed sensor 16R for detecting a right wheel speed VR of a right wheel of the vehicle, an output signal from a steering angle sensor 18 for detecting a steering angle STA of a steel wheel 17 by the driver, and various other sensor signals. Further, the output signals from the ECU 20 are input to the actuators 11L and 11R of the left and right headlights 10L and 10R of the vehicle, whereby the beam directions of the left and right headlights 10L and 10R are adjusted.

Figure 2:
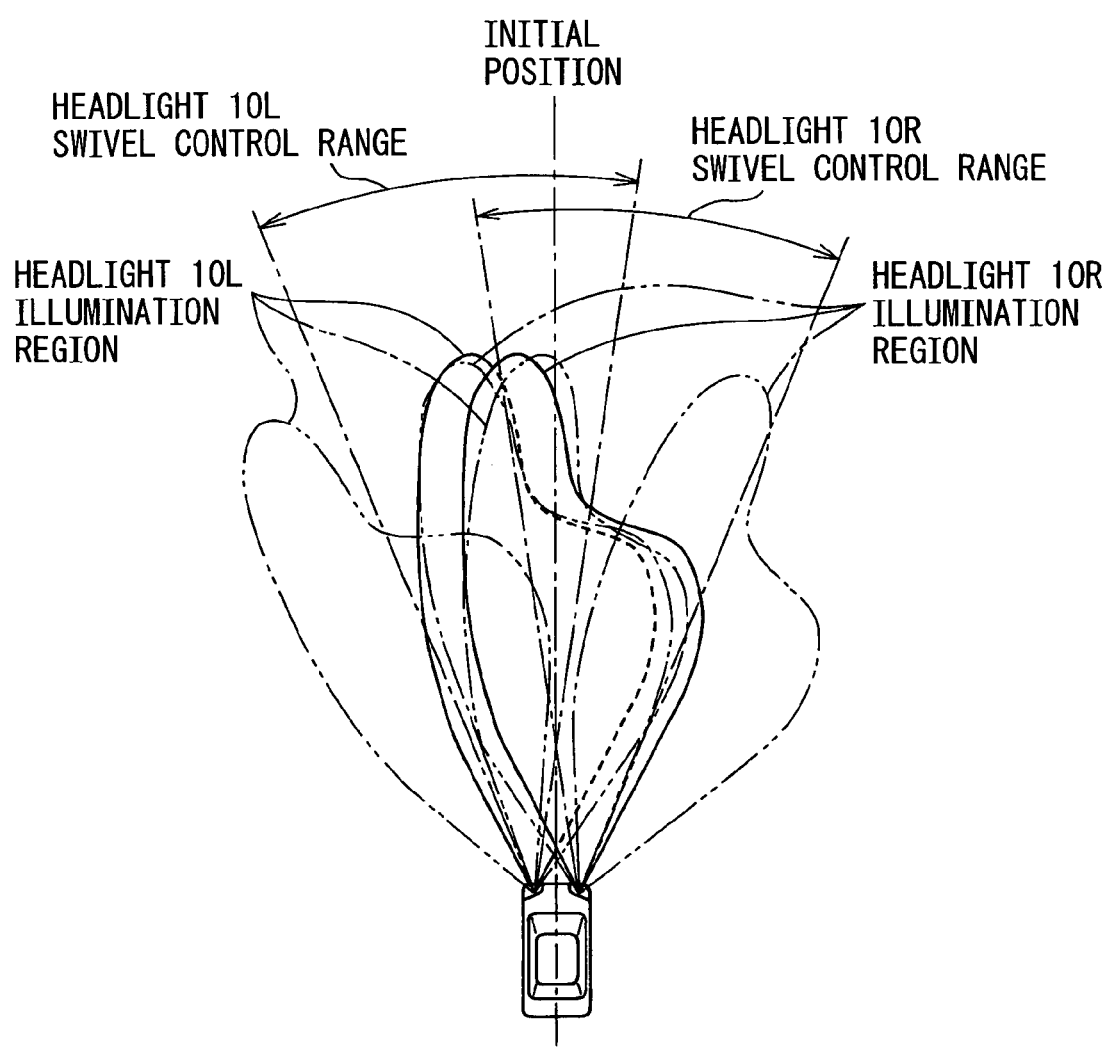
FIG. 2 is an explanatory view of illumination regions of headlights in an automatic vehicle headlight beam direction adjustment system according to a first embodiment and second embodiment of the present invention.

Note that in the configuration of the present embodiment, as shown in FIG. 2, the illumination regions (low beam) of the headlights 10R and 10L are adjusted in the swivel control range to the right direction or left direction from the initial position in accordance with steering in the right direction or left direction from the neutral direction of the steering wheel 17. This swivel control range has been set considering the visibility in the right direction or left direction based on the operation of the steering wheel 17 by the driver without impairing the front visibility of the driver. Therefore, in right swiveling by operation of the steering wheel 17 of the vehicle, the swivel control range of the headlight 10R in the right direction for the illumination region of the headlight 10R is made wider than the swivel control range of the headlight 10L of the left direction with respect to the illumination region of the headlight 10L. Conversely, in left swiveling by operation of the steering wheel 17 of the vehicle, the swivel control range of the headlight 10L in the left direction for the illumination region of the headlight 10L is made wider than the swivel control range of the headlight 10R of the right direction with respect to the illumination region of the headlight 10R.

Next, the flow chart of FIG. 3 showing the processing routine of the swivel control in the CPU 21 in the ECU 20 used in the automatic vehicle headlight beam direction adjustment system according to the first embodiment of the present invention will be explained. Note that the swivel control routine is executed repeatedly by the CPU 21 every predetermined time interval.

In FIG. 3, at step S101, the steering angle STA detected by the steering angle sensor 18 is read. Next, the routine proceeds to step S102, where the left wheel speed SPDL detected by the left wheel speed sensor 16L is read. Next, the routine proceeds to step S103, where the right wheel speed SPDR detected by the right wheel speed sensor 16R is read. Next, the routine proceeds to step S104, where front road information DNAVI comprised of map information, the vehicle position, etc. from the navigation system 15 is read.

Next, the routine proceeds to step S105, where the swivel control angle SWC is calculated in accordance with the steering angle STA read at step S101 and the speed SPD based on the left wheel speed SPDL read at step S102 and the right wheel speed SPDR read at step S103. Here, considering the fine fluctuations etc. in the steering angle STA or speed SPD, predetermined smoothening processing is executed. Next, the routine proceeds to step S106, where an estimated swivel control angle ESWC is calculated in accordance with the speed SPD based on the left wheel speed SPDL read at step S102 and the right wheel speed SPDR read at step S103 and the front road information DNAVI from the navigation system read at step S104.

Next, the routine proceeds to step S107, where it is determined if the steering wheel 17 has been operated. If the condition for determination at step S107 does not stand, that is, if the steering angle STA read at step S101 is less than a predetermined value not over an insensitive zone of the neutral position and therefore it is determined that the steering wheel has not been operated, it is judged that the vehicle is running straight and the routine proceeds to step S108. At step S108, it is determined if swivel advance control has been requested at this time. That is, at step S106, the estimated swivel control angle ESWC is calculated in accordance with the speed SPD and the front road information DNAVI and it is determined if swivel advance control based on the estimated swivel control angle ESWC has been requested.

When the condition for determination at step S108 stands, that is, when swivel advance control based on the estimated swivel control angle ESWC is being requested, the routine proceeds to step S109, where the output signal based on the estimated swivel control angle ESWC calculated at step S106 as swivel advance control processing is input to the actuators 11L and 11R of the left and right headlights 10L and 10R and the beam directions of the left and right headlights 10L and 10R are adjusted.

Next, the routine proceeds to step S110, where the duration counter measuring the duration of the swivel advance control processing at step S109 is incremented by "+1". Note that this duration counter is reset and restarted every time reading of the front road information DNAVI finds that there is a new turn at the front road in the direction of advance of the vehicle and new swivel advance control processing is started. Next, the routine proceeds to step S111, where it is determined if the duration counter is a predetermined value α or more. If the condition for determination of step S111 does not stand, that is, when the duration counter is less than the predetermined value α, the routine ends. Note that this predetermined value α is set in advance to several seconds at the most by time conversion.

On the other hand, when the condition for determination at step S111 stands, that is, when the duration counter is larger than the predetermined value α, the routine proceeds to step S112. At step S112, it is judged that the fact that the swivel advance control processing based on the estimated swivel control angle ESWC continues for more than a predetermined time despite the steering wheel 17 not being operated and the vehicle running straight is probably due to an error in the front road information DNAVI comprised of map information, vehicle position, etc. from the navigation system 15, swivel advance control suspension processing for suspending the swivel advance control is executed, and the routine is ended.

Note that in this swivel advance control suspension processing, it is judged that the estimated swivel control angle ESWC at that time is "0", the output signals based on this are input to the actuators 11L and 11R of the left and right headlights 10L and 10R, and the beam directions of the left and right headlights 10L and 10R are returned to the initial positions in the direction of advance of the vehicle. Further, this swivel advance control suspension processing is released when finding a new turn at the front road in the direction of advance of the vehicle by reading of the front road information DNAVI.

On the other hand, when the condition for determination of step S108 does not stand, that is, when the estimated swivel control angle ESWC calculated at step S106 is "0" and the swivel advance control is not requested, the routine proceeds to step S113, where the duration counter is cleared to "0", then the routine is ended.

On the other hand, when the condition for determination at step S107 stands, that is, when the steering angle STA read at step S101 is a predetermined value or more exceeding the insensitive zone of the neutral position and it is determined there is steering, it is judged that the vehicle is turning, the routine proceeds to step S114, and the duration counter is cleared to "0". Next, the routine proceeds to step S115, where as swivel control processing, the output signal based on the swivel control angle SWC calculated at step S105 and the estimated swivel control angle ESWC calculated at step S106 is input to the actuators 11L and 11R of the left and right headlights 10L and 10R, the beam directions of the left and right headlights 10L and 10R are adjusted, and the routine is ended.

Note that in this swivel control processing of step S115, for example, when during swivel advance control based on the estimated swivel control angle ESWC at this time, swivel advance control is given priority to over the swivel control based on the swivel control angle SWC until the swivel control angle SWC reaches the estimated swivel control angle ESWC.

In this way, the automatic vehicle headlight direction adjustment system of the first embodiment comprises a steering angle sensor 18 serving as steering angle detecting means for detecting a steering angle STA of a steering wheel 17 of a vehicle, a left wheel speed sensor 16L and right wheel speed sensor 16R serving as speed detecting means for detecting a speed SPD of a vehicle, road information detecting means realized by an ECU 20 for detecting front road information DNAVI from a navigation system 15 mounted in a vehicle, estimated control quantity processing means realized by an ECU 20 for calculating an estimated swivel control angle ESWC as an estimated control quantity for adjusting beam directions of left and right headlights 10L and 10R of a vehicle using as parameters the speed SPD detected based on the output signals of the left wheel speed sensor 16L and right wheel speed sensor 16R and the front road information DNAVI detected by the road information detecting means, swivel advance control means realized by an ECU 20 for making the beam directions of the left and right headlights 10L and 10R swivel in left-right directions parallel to the horizontal direction for adjustment based on the estimated swivel control angle ESWC when the estimated control quantity processing means calculates the estimated swivel control angle ESWC before detection of the steering angle STA, running state determining means realized by an ECU 20 for determining if the vehicle is running straight or turning after adjustment of the beam directions of the headlights based on the estimated swivel control angle ESWC by the swivel advance control means has continued for a predetermined time, and swivel suspending means realized by an ECU 20 for suspending adjustment of the beam directions of the headlights 10L and 10R based on the estimated swivel control angle ESWC when the beam directions of the left and right headlights 10L and 10R differ from the direction of advance (initial positions) of the vehicle regardless if the running state determining means determines that the vehicle is running straight.

That is, when the estimated swivel control angle ESWC using as parameters the speed SPD detected based on the output signals from the left wheel speed sensor 16L and the right wheel speed sensor 16R and the front road information DNAVI from the navigation system 15 detected by the road information detecting means is calculated before the steering angle STA is detected, the beam directions of the left and right headlights 10L and 10R are swiveled in the left-right directions parallel to the horizontal direction for adjustment as swivel advance control based on the estimated swivel control angle ESWC. After the swivel advance control in advance of the operation of the steering wheel 17 has continued for a predetermined period, despite the vehicle being determined to be running straight, when the beam directions of the left and right headlights 10L and 10R are not the direction of advance of the vehicle, it is judged that there is an error in the estimated swivel control angle ESWC and adjustment of the beam directions of the left and right headlights 10L and 10R by the swivel advance control is suspended.

Therefore, before detection of the steering angle STA, the swivel advance control making the beam directions of the left and right headlights 10L and 10R swivel to the left-right directions parallel to the horizontal direction according to the estimated swivel control angle ESWC will no longer continue over the predetermined time due to the error of the front road information DNAVI regardless of the vehicle running straight, and the front visibility of the driver can be quickly restored.

Further, the running state determining means realized by the ECU 20 of the automatic vehicle headlight beam direction adjustment system of this embodiment determines the running state of the vehicle using the steering angle STA. That is, it compares the steering angle STA obtained by the steering angle sensor 18 and a predetermined value set as an insensitive zone at the neutral position of the steering wheel 17 to determine the existence of steering of the steering wheel 17. Further, when the steering angle STA is smaller than a predetermined value and there is no operation of the steering wheel 17, it can be determined that the vehicle is running straight, while when the steering angle STA is equal to or larger than a predetermined value and there is operation of the steering wheel 17, it can be determined that the vehicle is turning.

In this embodiment, it is determined if the steering angle STA of the steering wheel 17 is over the insensitive zone of the neutral position, that is, if the vehicle is running straight or turning, according to the existence of any steering angle, but the present invention is not limited to this. It is also possible to determine the running state of the vehicle by the existence of a physical quantity based on at least one parameter of a difference in speed of the left/right wheels of the vehicle comprised of the difference between the left wheel speed SPDL and the right wheel speed SPDR, a yaw rate, and horizontal direction G or a combination thereof.

Second Embodiment

Figure 4A:
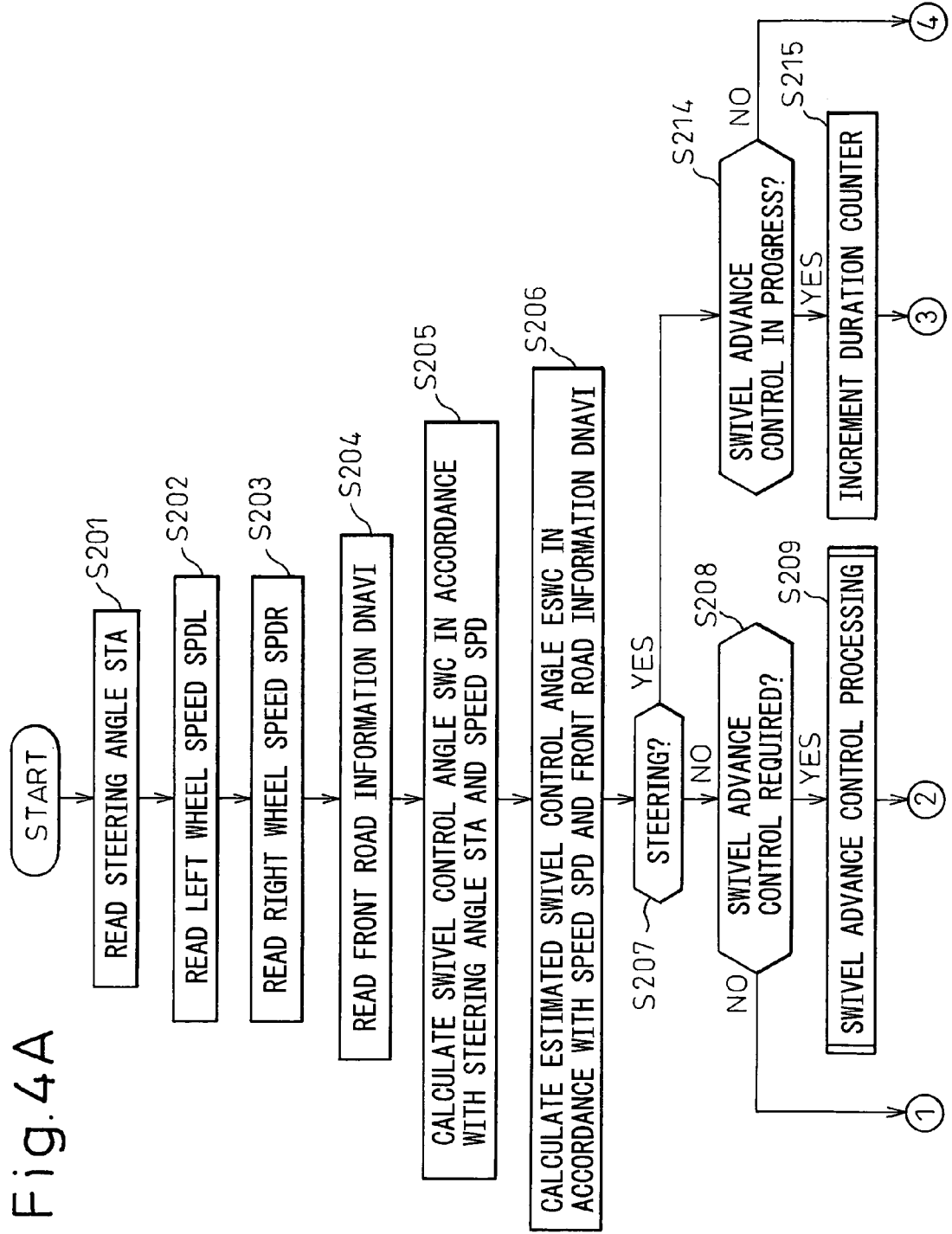

FIG. 4A and FIG. 4B are a flow chart of the processing routine of swivel control in a CPU 21 in an ECU 20 used in an automatic vehicle headlight beam direction adjustment system according to a second embodiment of the present invention. Note that this swivel control routine is repeatedly executed by the CPU 21 every predetermined time interval. Here, the configuration of the automatic vehicle headlight beam direction adjustment system according to the present embodiment is the same as in the schematic view of FIG. 1 in the first embodiment. Further, the illumination regions of the headlights are the same as in the explanatory view of FIG. 2 in the first embodiment, so detailed explanations will be omitted.

In FIG. 4A and FIG. 4B, at step S201, the steering angle STA detected by the steering angle sensor 18 is read. Next, the routine proceeds to step S202, where the left wheel speed SPDL detected by the left wheel speed sensor 16L is read. Next, the routine proceeds to step S203, where the right wheel speed SPDR detected by the right wheel speed sensor 16R is read. Next, the routine proceeds to step S204, where the front road information DNAVI comprised of map information, vehicle position, etc. from the navigation system 15 is read.

Next, the routine proceeds to step S205, where the swivel control angle SWC is calculated in accordance with the steering angle STA read at step S201 and the speed SPD based on the left wheel speed SPDL read at step S202 and the right wheel speed SPDR read at step S203. Here, considering the fine fluctuations etc. in the steering angle STA or speed SPD, predetermined smoothening processing is executed. Next, the routine proceeds to step S206, where the estimated swivel control angle ESWC is calculated in accordance with the speed SPD based on the left wheel speed SPDL read at step S202 and the right wheel speed SPDR read at step S203 and the front road information DNAVI from the navigation system read at step S204.

Next, the routine proceeds to step S207, where it is determined if the steering wheel 17 has been operated. If the condition for determination at step S207 does not stand, that is, if the steering angle STA read at step S201 is less than a predetermined value not over an insensitive zone of the neutral position and it is determined that the steering wheel has not been operated, it is judged that the vehicle is running straight and the routine proceeds to step S208. At step S208, it is determined if swivel advance control has been requested at this time. That is, at step S206, the estimated swivel control angle ESWC is calculated in accordance with the speed SPD and the front road information DNAVI and it is determined if swivel advance control based on the estimated swivel control angle ESWC has been requested.

When the condition for determination at step S208 stands, that is, when swivel advance control based on the estimated swivel control angle ESWC is being requested, the routine proceeds to step S209, where the output signal based on the estimated swivel control angle ESWC calculated at step S206 as swivel advance control processing is input to the actuators 11L and 11R of the left and right headlights 10L and 10R and the beam directions of the left and right headlights 10L and 10R are adjusted.

Next, the routine proceeds to step S210, where the duration counter measuring the duration of the swivel advance control processing at step S209 is incremented by "+1". Note that this duration counter is reset and restarted every time reading of the front road information DNAVI finds that there is a new turn at the front road in the direction of advance of the vehicle and new swivel advance control processing is started. Next, the routine proceeds to step S211, where it is determined if the duration counter is a predetermined value α or more. If the condition for determination of step S211 does not stand, that is, when the duration counter is less than the predetermined value α, the routine ends. Note that this predetermined value α is set in advance to several seconds at the most by time conversion.

On the other hand, when the condition for determination at step S211 stands, that is, when the duration counter is larger than the predetermined value α, the routine proceeds to step S212. At step S212, it is judged that the fact that the swivel advance control processing based on the estimated swivel control angle ESWC continues for more than a predetermined time despite the steering wheel 17 not being operated and the vehicle running straight is probably due to an error in the front road information DNAVI comprised of map information, vehicle position, etc. from the navigation system 15, swivel advance control suspension processing for canceling the swivel advance control is executed, and the routine is ended.

Note that in this swivel advance control suspension processing, it is judged that the estimated swivel control angle ESWC at that time is "0", the output signal based on this is input to the actuators 11L and 11R of the left and right headlights 10L and 10R, and the beam directions of the left and right headlights 10L and 10R are returned to the initial positions in the direction of advance of the vehicle. Further, this swivel advance control suspension processing is released when finding a new turn at the front road in the direction of advance of the vehicle by reading of the front road information DNAVI.

On the other hand, when the condition for determination of step S208 does not stand, that is, when the estimated swivel control angle ESWC calculated at step S206 is "0" and the swivel advance control is not requested, the routine proceeds to step S213, where the duration counter is cleared to "0", then the routine is ended.

On the other hand, when the condition for determination at step S207 stands, that is, when the steering angle STA read at step S201 is a predetermined value or more exceeding the insensitive zone of the neutral position and it is determined there is steering, it is judged that the vehicle is turning, the routine proceeds to step S214, and it is determined if the swivel advance control is in progress. When the condition for determination of step S214 stands, that is, when the swivel advance control is in progress at this time, the routine proceeds to step S215, where the duration counter reset and restarted at step S210 is incremented by "+1". Next, the routine proceeds to step S216, where it is determined if the duration counter is a predetermined value β or more. When the condition for determination at step S216 does not stand, that is, when the duration counter is smaller than the predetermined value β, the routine ends. Note that this predetermined value β is set, by time conversion, so as to normally become the time when the swivel advance control processing is started based on the estimated control quantity ESWC in accordance with the speed SPD and front road information DNAVI before actual steering. The predetermined value β<predetermined value α. Therefore, at this time, if the swivel advance control processing is executed, the processing is continued.

On the other hand, if the condition for determination of step S216 stands, that is, if the duration counter is the predetermined value β or more, the routine proceeds to step S217. At step S217, it is determined if the steering direction and beam directions differ. When the condition for determination of step S217 stands, that is, when the steering direction of the steering wheel 17 and the beam directions of the left and right headlights 10L and 10R due to the swivel advance control differ, the routine proceeds to step S218. At step S218, the determination of step S217 is repeated until the predetermined time γ elapses. When the state of the steering direction and beam directions differing continues throughout this time, the routine proceeds to step S219.

At step S219, the estimated swivel control angle ESWC used in the swivel advance control processing is cancelled to "0". Further, the routine proceeds to step S220, where as the swivel switching control processing, the output signal based on the swivel control angle SWC in accordance with the steering angle STA and speed SPD is input to the actuators 11L and 11R of the left and right headlights 10L and 10R, the beam directions of the left and right headlights 10L and 10R are adjusted, and the routine ends. Note that this swivel switching control processing is released when finding a new turn in the front road in the direction of advance of the vehicle by reading of the front road information DNAVI.

On the other hand, when the condition for determination at step S214 does not stand, that is, when the swivel advance control is not in progress at that time, or when the condition for determination at step S217 does not stand, that is, when the steering direction of the steering wheel 17 and the beam directions of the left and right headlights 10L and 10R due to the swivel advance control match, the routine proceeds to step S221, where the duration counter is cleared to "0". Next, the routine proceeds to step S222, where as swivel control processing, the output signal based on the swivel control angle SWC calculated at step S205 and the estimated swivel control angle ESWC calculated at step S206 is input to the actuators 11L and 11R of the left and right headlights 10L and 10R, the beam directions of the left and right headlights 10L and 10R are adjusted, and the routine is ended. Note that in this swivel control processing of step S222, for example, when during swivel advance control based on the estimated swivel control angle ESWC at this time, swivel advance control is given priority to over the swivel control based on the swivel control angle SWC until the swivel control angle SWC reaches the estimated swivel control angle ESWC.

In this way, the automatic vehicle headlight direction adjustment system of the second embodiment comprises a steering angle sensor 18 serving as steering angle detecting means for detecting a steering angle STA of a steering wheel 17 of a vehicle, a left wheel speed sensor 16L and right wheel speed sensor 16R serving as speed detecting means for detecting a speed SPD of a vehicle, road information detecting means realized by an ECU 20 for detecting front road information DNAVI from a navigation system 15 mounted in a vehicle, control quantity processing means realized by an ECU 20 for calculating the swivel control angle SWC as a control quantity for adjusting the beam directions of the left and right headlights 10L and 10R of the vehicle using as parameters the steering angle STA detected by the steering angle sensor 18 and the speed SPD detected based on the output signals of the left wheel speed sensor 16L and the right wheel speed sensor 16R, estimated control quantity processing means realized by an ECU 20 for calculating an estimated swivel control angle ESWC as an estimated control quantity for adjusting beam directions of left and right headlights 10L and 10R of a vehicle using as parameters the speed SPD detected based on the output signals of the left wheel speed sensor 16L and right wheel speed sensor 16R and the front road information DNAVI detected by the road information detecting means, swivel advance control means realized by an ECU 20 for making the beam directions of the left and right headlights 10L and 10R swivel in a left-right direction parallel to the horizontal direction for adjustment based on the estimated swivel control angle ESWC when the estimated control quantity processing means calculates the estimated swivel control angle ESWC before detection of the steering angle STA, adjustment direction determining means realized by an ECU 20 for determining the adjustment directions of the beam directions of the left and right headlights 10L and 10R based on the swivel control angle SWC calculated by the control quantity processing means and the adjustment directions of the beam directions of the left and right headlights 10L and 10R based on the estimated swivel control angle ESWC calculated by the estimated control quantity processing means after detection of the steering angle STA, and swivel switching control means realized by an ECU 20 for cancelling the estimated control quantity ESWC and switching to adjustment of the beam directions of the left and right headlights 10L and 10R based only on the control quantity SWC when the adjustment direction determining means determines that the adjustment directions of the beam directions of the left and right headlights 10L and 10R differ after adjustment of the beam directions of the left and right headlights 10L and 10R based on the estimated swivel control angle ESWC by the swivel advance control means has continued for a predetermined time.

That is, when the estimated swivel control angle ESWC using as parameters the speed SPD detected based on the output signals from the left wheel speed sensor 16L and the right wheel speed sensor 16R and the front road information DNAVI from the navigation system 15 detected by the road information detecting means is calculated before the steering angle STA is detected by the steering angle sensor 18, the beam directions of the left and right headlights 10L and 10R are swiveled in the left-right directions parallel to the horizontal direction for adjustment as swivel advance control based on the estimated swivel control angle ESWC. On the other hand, after the steering angle STA is detected, the adjustment of the beam directions of the left and right headlights 10L and 10R based on the estimated swivel control angle ESWC continues for a predetermined time. When at this time the adjustment directions of the beam directions of the left and right headlights 10L and 10R based on the swivel control angle SWC using as parameters the steering angle STA and speed SPD and the adjustment directions of the beam directions of the left and right headlights 10L and 10R based on the estimated swivel control angle ESWC do not match and are determined to be different, it is judged that there is an error in the estimated swivel control angle ESWC, the adjustment is cancelled, and the adjustment is switched to adjustment of the beam directions of the left and right headlights 10L and 10R based on only the swivel control angle SWC.

Therefore, after detection of the steering angle STA, if the adjustment directions for making the beam directions of the left and right headlights 10L and 10R swivel in the left-right directions parallel to the horizontal direction swivel for adjustment by the estimated swivel control angle ESWC differ from the adjustment directions for making the beam directions of the left and right headlights 10L and 10R swivel in the left-right directions parallel to the horizontal direction swivel for adjustment by the swivel control angle SWC, it is judged that there is an error in the front road information DNAVI, the estimated swivel control angle ESWC is cancelled, and the adjustment is switched to adjustment of the beam directions of the left and right headlights 10L and 10R by only the swivel control angle SWC, whereby adjustment of the beam directions of the left and right headlights 10L and 10R including mistaken front road information DNAVI by the swivel advance control will no longer be continued for more than a predetermined time and the front visibility of the driver can be quickly restored.

In the above embodiment, the adjustment directions of the beam directions of the headlights 10L and 10R are specified by the steering angle STA detected by the steering angle sensor 18, but when working the present invention, the invention is not limited to this. When specifying the adjustment directions of the beam directions of the headlights 10L and 10R by the change of the steering angle per unit time before the smoothening processing of the steering angle STA and the state of the adjustment directions differing from the adjustment directions of the beam directions of the headlights 10L and 10R based on the front road information DNAVI from the navigation system 15 continues for a predetermined time γ, it may be deemed that there is an error in the front road information DNAVI. Further, it is also possible to use the speed of change of the steering angle instead of the amount of change of the steering angle.

While the invention has been described with reference to specific embodiments chosen for purpose of illustration, it should be apparent that numerous modifications could be made thereto by those skilled in the art without departing from the basic concept and scope of the invention.

What is claimed is:

1. An automatic vehicle headlight direction adjustment system comprising:
    steering angle detecting means for detecting a steering angle of a steering wheel of a vehicle,
    speed detecting means for detecting a speed of a vehicle,
    road information detecting means for detecting front road information from a navigation system mounted in a vehicle,
    estimated control quantity processing means for calculating an estimated control quantity for adjusting beam directions of headlights of a vehicle using as parameters the speed detected by the speed detecting means and the front road information detected by the road information detecting means,
    swivel advance control means for making the beam directions of the headlights swivel in left-right directions parallel to the horizontal direction for adjustment based on said estimated control quantity when said estimated control quantity processing means calculates said estimated control quantity before detection of said steering angle,
    running state determining means for determining if said vehicle is running straight or turning after adjustment of the beam directions of the headlights based on said estimated control quantity by said swivel advance control means has continued for a predetermined time, and
    swivel suspending means for suspending adjustment of the beam directions of the headlights based on said estimated control quantity when the beam directions of said headlights differ from the direction of advance of the vehicle if said running state determining means determines that said vehicle is running straight.

2. An automatic vehicle headlight direction adjustment system as set forth in claim 1, wherein said running state determining means determines a running state of said vehicle using at least one parameter of said steering angle, a wheel speed difference between the speeds of the left/right wheels of said vehicle, a yaw rate, and horizontal direction G (gravity).

3. An automatic vehicle headlight direction adjustment system comprising:
    steering angle detecting means for detecting a steering angle of a steering wheel of a vehicle,
    speed detecting means for detecting a speed of a vehicle,
    road information detecting means for detecting front road information from a navigation system mounted in a vehicle,
    control quantity processing means for calculating a control quantity for adjusting beam directions of the headlights of said vehicle using as parameters the steering angle detected by said steering angle detecting means and the speed detected by said speed detecting means,
    estimated control quantity processing means for calculating an estimated control quantity for adjusting beam directions of headlights of a vehicle using as parameters the speed detected by the speed detecting means and the front road information detected by the road information detecting means, swivel advance control means for making the beam directions of the headlights swivel in left-right directions parallel to the horizontal direction for adjustment based on said estimated control quantity when said estimated control quantity processing means calculates said estimated control quantity before detection of said steering angle, adjustment direction determining means for determining adjustment directions of the beam directions of said headlights based on the control quantity calculated by said control quantity processing means and adjustment directions of the beam directions of said headlights based on the estimated control quantity calculated by said estimated control quantity processing means after detection of said steering angle, and swivel switching control means for canceling said estimated control quantity and switching to adjustment of the beam directions of said headlights based only on said control quantity when said adjustment direction determining means determines that the adjustment directions of the beam directions of said headlights differ from the adjustment directions of the beam directions of said headlights based on said control quantity, after adjustment of the beam directions of the headlights based on said estimated control quantity by said swivel advance control means has continued for a predetermined time.

* * * * *